United States Patent [19]

Ben-Zvi et al.

[11] Patent Number: 5,387,456

[45] Date of Patent: Feb. 7, 1995

[54] METHOD FOR PRODUCING TRANSPARENT PANEL UNITS A PANEL UNIT THUS PRODUCED AND A CALENDAR ROLL THEREFOR

[75] Inventors: Nir Ben-Zvi; Shaul Giovoni, both of Upper Galilee, Israel

[73] Assignee: Dan Pal, Galilee, Israel

[21] Appl. No.: 885,954

[22] Filed: May 20, 1992

[30] Foreign Application Priority Data

May 21, 1991 [IL] Israel ........................ 98195

[51] Int. Cl.6 .................... B32B 3/02; B32B 5/14
[52] U.S. Cl. ............................ 428/119; 428/126; 428/99; 428/167; 428/181; 428/192; 428/38; 428/418; 428/122; 428/83; 428/358; 52/821; 52/823; 52/578
[58] Field of Search .............. 428/119, 126, 99, 167, 428/181, 192, 38, 918, 122, 83, 358; 52/821, 823, 578

[56] References Cited

U.S. PATENT DOCUMENTS

| | | | |
|---|---|---|---|
| 3,329,555 | 7/1967 | Sonneborn et al. | 428/126 |
| 3,416,282 | 12/1968 | Daugherty | 52/823 |
| 3,478,138 | 11/1969 | Freisner | 156/201 |
| 3,533,896 | 10/1970 | Hartig | 428/119 |
| 3,574,449 | 4/1971 | Rosenberg | 52/578 |
| 4,435,460 | 3/1984 | Menzel | 428/126 |
| 4,454,181 | 6/1984 | Hohn | 428/99 |
| 4,463,046 | 7/1984 | Hutchison et al. | 428/126 |
| 4,562,027 | 12/1985 | Behr et al. | 264/177.1 |
| 4,775,570 | 10/1988 | Ohlenforst et al. | 428/192 |
| 4,925,512 | 5/1990 | Briand | 264/146 |
| 4,985,192 | 1/1991 | Roeder et al. | 264/146 |

FOREIGN PATENT DOCUMENTS 0155612 9/1985 European Pat. Off. .
0338784 10/1989 European Pat. Off. .
2528350 12/1983 France .

Primary Examiner—William Watkins, III
Attorney, Agent, or Firm—Beveridge, DeGrandi, Weilacher & Young

[57] ABSTRACT

There is provided a method for producing extruded, optical-quality, transparent panel units having integral flange members for joining to adjacent, similar panel units. The method includes the steps of extruding a substantially flat strip of suitable plastic material, calendering the extruded strip by pulling it in the still hot, pliable state through a calender, at least the central portion of the strip being smoothened to an optical-quality transparency and the marginal portions of the strip being provided with at least one sawtooth-like, continuous projection on at least one face of the marginal portions, controllably heating the strip at a limited zone on the one face to render the zone pliable, using bending rolls to bend the marginal portions at substantially a right angle, so as to turn them into flange members, the inside corners formed by the bending rolls between the central portion and the marginal portions being rounded, and finally, cutting the flanged panels to required length. A panel unit and a calender roll for producing the unit are also disclosed.

2 Claims, 3 Drawing Sheets

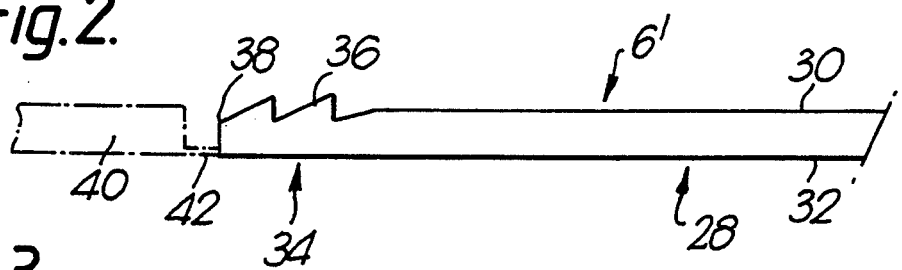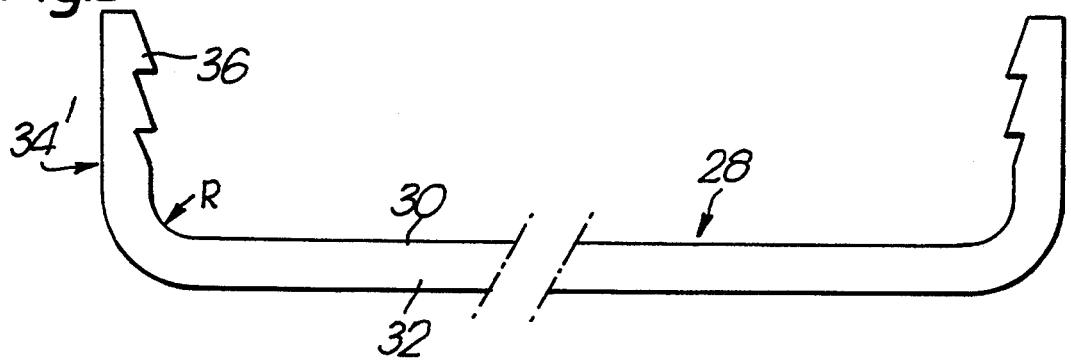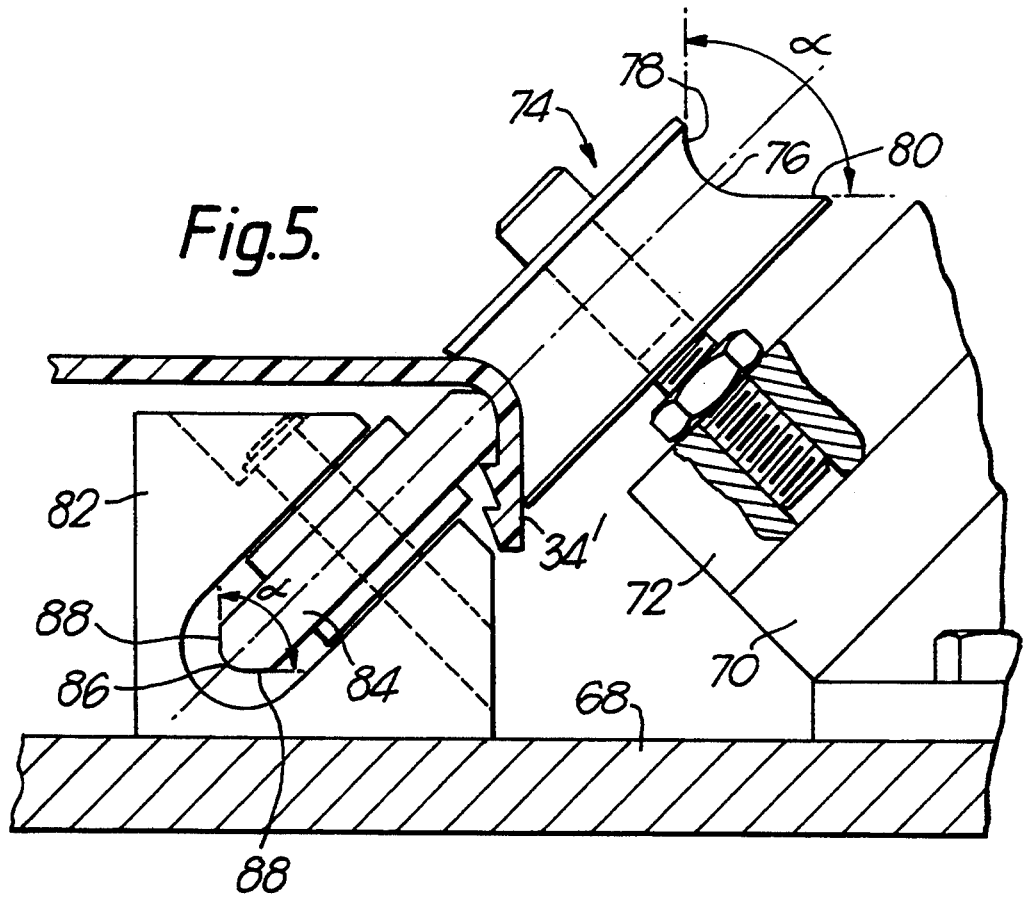

METHOD FOR PRODUCING TRANSPARENT PANEL UNITS A PANEL UNIT THUS PRODUCED AND A CALENDAR ROLL THEREFOR

FIELD OF THE INVENTION

The present invention relates to a method for producing extruded, optical-quality, transparent panel units having integral flange members for joining to adjacent, similar panel units.

The invention further relates to a panel unit thus produced and to a calender roll for producing blanks for such a panel unit.

BACKGROUND DISCUSSION

While the use of extrusion for producing plastic panels of various cross-sections is known, such panels are at best translucent, but not transparent. For optical-quality transparency, extruded panels have to undergo a calendering process, when they are passed between several rolls having a hard, highly-polished surface. Optical-quality surfaces are therefore contingent on "rollability", and the demand for rollability imposes certain constraints and limitations on surface configuration (quite apart from the general rollability condition of the absence of undercuts which holds for all rolling operation, regardless of surface quality), namely, the specific condition of an absence of friction between rolling and rolled surfaces. Technically, this translates into the condition that the surface speed of all points of active roll surfaces be identical, which obviously means that the radii of these points be identical, too, as surface speed at a given rotational speed is a function of radius.

Another constraint of basic rolling techniques is the impossibility of producing flanged panels in which the flange surfaces have features such as grooves, serrations, teeth, etc.

SUMMARY OF THE INVENTION

It is one of the objects of the present invention to provide a method permitting circumvention of at least some of the above-mentioned constraints, thus enabling the production of optical-quality panels having joining flanges possessing surface features facilitating the joining thereof to adjacent flanges of similar panels.

This is achieved according to the invention by providing a method for producing extruded, optical-quality, transparent panel units having integral flange members for joining to adjacent, similar panel units, comprising the steps of extruding a substantially flat strip of a suitable plastic material, said strip being of a width at least equalling the combined widths of said panel and said flange members; calendering said extruded strip by pulling it in the still hot, pliable state through a calendar comprising at least a pair of calendering rolls, wherein at least the central portion of said strip is smoothened to an optical-quality transparency and the marginal portions of said strip are provided with at least one sawtooth-like, continuous projection on at least one face of said marginal portions; controllably heating said strip at a limited zone on said at least one face to render said zone pliable; using bending rolls to bend said marginal portions at substantially a right angle to turn them into flange members, at least the inside corners formed by said bending rolls between said central portion and said marginal portions being rounded, and cutting said flanged panels to required length.

The invention further provides a solid, optical-quality, transparent panel unit produced from a strip-like plastic extrusion, comprising two fully transparent major surfaces constituting the effective panel portion, and two flange members raised by bending action from said strip-like extrusion and thus integrally connected to, and laterally projecting from, said panel portion, at least one surface of each of said flange members being provided with surface features, at least some of which facilitate the joining of said panel units to similar, adjacent units, wherein at least the inside corners formed by said bending action between said effective panel portion and said flange members are rounded.

There is further provided a calender roll for producing, from a strip-like plastic extrusion, at least partly transparent blanks for a panel unit having integral flange members for joining to adjacent, similar panel units, comprising a substantially cylindrical roll jacket having a central portion comprised of a hard and highly polished surface of an axial extent substantially corresponding to the width of said panel unit, and two end portions each of an axial extent at least corresponding to the width of said integral flange member, two journals to which said jacket is fixedly and coaxially attached, and means to maintain said jacket at a predeterminable, constant temperature, wherein said end portions carry the substantial features, in negative, of those surfaces of said integral flange members that are in contact with said end portions.

BRIEF DESCRIPTION OF THE DRAWINGS

The invention will now be described in connection with certain preferred embodiments with reference to the following illustrative figures so that it may be more fully understood.

With specific reference now to the FIGS. in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is a schematic representation of a production line according to the method of the invention;

FIG. 2 shows, in partial view, the post-calendaring shape of a preferred embodiment of the panel according to the invention;

FIG. 3 illustrates the same embodiment after raising of the flange members;

FIG. 4 is a partial view, in partial cross-section, of a calendering roll according to the invention, and FIG. 5 represents a pair of bending rollers.

DETAILED DESCRIPTION

Figure 1:
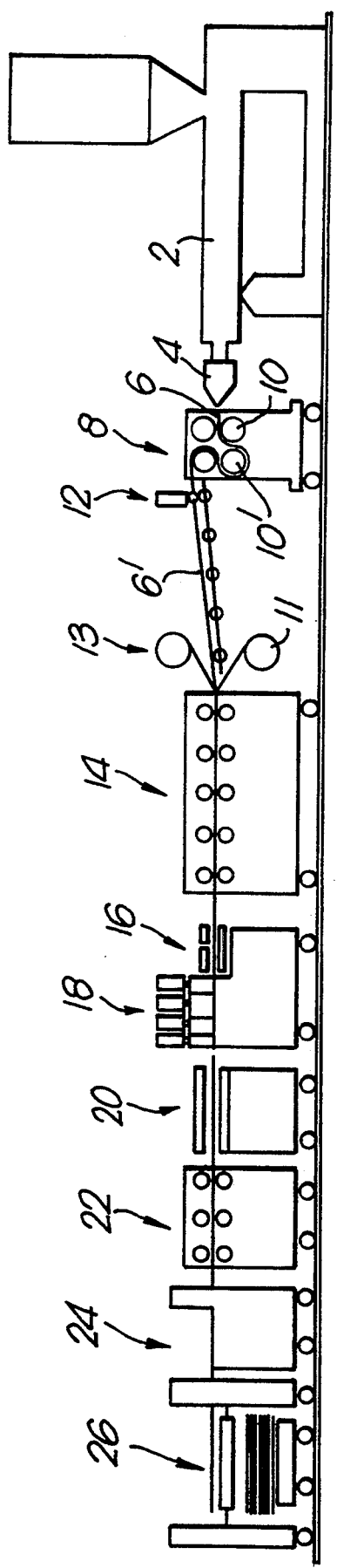

Referring now to the drawings, there is seen in the schematic representation of a production line in FIG. 1 an extruder 2, the nozzle 4 of which yields a flat strip 6 consisting of a plastic material such as PC, PMMA, ABS or the like, and having a width at least equalling the combined widths of the panel and the two flange members, the precise shape of which will be discussed further below.

Directly after emerging from the extruder nozzle 4, the extruded strip 6, while still in the plastic, pliable state, is introduced into the calender unit 8 which, in this case, comprises two pairs of calendaring rolls 10, 10', the detailed design of which will be explained further below, and the purpose of which is two-fold:

a) to smoothen the central portion of the strip (i.e., that portion of the strip that, eventually, will constitute the panel proper) to an optical-quality transparency, and b) to roll-emboss the two marginal portions that abut the above-mentioned central portion (and that will eventually become the two flanges of the panel unit) with certain surface features to be discussed further below.

The next work station is the edge trimmer 12, in which a rotary knife cuts off the surplus material produced during the calendering stage.

Subsequently, the strip 6' arrives at the coating station 13 in which it is given a protective cover in the form of a paper or PE web or film drawn off two reels 11 to preserve its high-quality finish during the subsequent method stages.

The next station is the so-called take off unit 14, at which the strip 6' arrives cooled and rigidified. It is this station that provides most of the pull required to move the strip 6' through the production line of FIG. 1. The rate of pull is not only constant, but must also be coordinated with the speed of the calender rolls and the rate of extrusion.

So far, it will be remembered, the product of the line is still a substantially flat strip having a central portion of optical-quality transparency, and two marginal portions with certain surface features.

Continuing to move down the line, the embossed strip 6' now passes a group of I.R. heating elements 16 configured and disposed in such a way that they heat only a narrow zone at which bending is going to take place.

Immediately after leaving the heating station 16, a number of hydraulically-operated rollers in the bending unit 18 engage the marginal portions of the strip 6' and, by imparting them a 90° bond, turn them into the flanges of the panel. A pair of such rollers is shown in FIG. 5. Of great importance is a sufficiently large radius at the inside of the bend, as otherwise excessive stress concentrations are liable to produce cracks and, eventually, ruptures.

After the bending stage, it is advantageous to relieve stresses and act against warping produced by such stresses. This is done with the aid of an I.R. annealing furnace 20.

The resistance encountered by the strip 6' when passing through the bending unit 18 requires the provision of another take-off unit 22 after the annealing stage.

A mechanical saw 24 cuts the panels to the required length, after which they are handled by the stacking unit 26.

FIG. 2 illustrates the shape of a "blank" for the preferred embodiment of the panel unit according to the invention, i.e., the shape of strip 6' (FIG. 1) after calendering, but before the flanges have been raised. There is seen the central panel portion 28 and its two surfaces 30, 32, calendered to an optical-quality finish, and one of the two marginal portions 34 which, subsequently, will constitute the panel flange members 34' (FIG. 3).

The upper surface of the marginal portion 34, roll-embossed in the calender unit 8, is provided with sawtooth-like ridges or projections 36 which, with the aid of per se known joining members, enable two adjacent panel units to be securely joined.

As seen in FIG. 2, the tips of the ridges 36 somewhat project above the surface 30 of the central portion 28. This apparent "addition" of material is of course due to the displacement, by the roll-embossing process, of material from the lower half of the wedge-shaped recesses that define the teeth. Altogether, the respective cross-sectional areas of the marginal portion 34 prior to and after roll-embossing are identical.

To obtain a clean and well-defined edge 38 during the calendering stage, the original strip 6 (FIG. 1) must be slightly wider than the panel prior to the raising of the flanges 34', so that the edge 38 is in fact produced by the roll-embossing portion of the calender roll to be discussed further below. The surplus material 40, connected to the marginal portion 34 by a thin strip 42 and shown in FIG. 2 by dash dotted lines, is cut off in the above-mentioned trimming stage.

The other surface 32 of the blank is completely plane.

While the central portion 28 of the panel unit is fully transparent, the end portions 34, because of the embossing operation, are merely translucent.

The profile of the finished panel unit is shown in FIG. 3. The rounded inside corner R, the importance of which was explained earlier, is clearly seen. The projections 36 form barb-like ridges which allow a joining member (not shown) to be pushed over them with relative ease, while strongly resisting removal.

Figure 4:
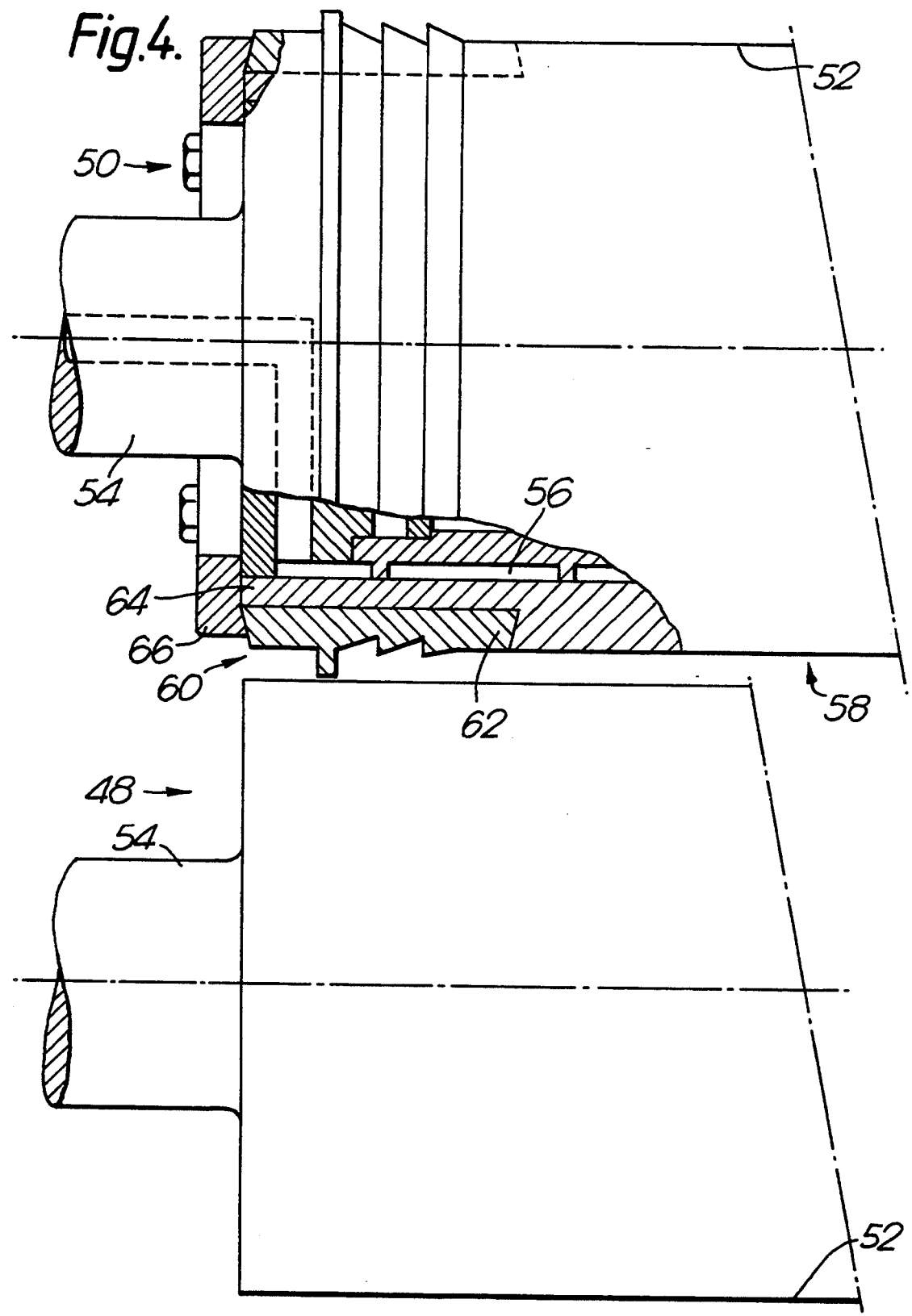

FIG. 4 illustrates a pair of calender rolls as used to produce the panel blank shown in FIG. 2. While the lower roll 48 is of the conventional type (since, as will be remembered, the surface 32 of the blank of FIG. 2 is completely smooth and plane and has no surface features), the upper roll 50 has the double task of calendering and roll-embossing.

Both rolls have a cylindrical roll jacket 52, two journals 54 mounted in bearings (not shown) and means to maintain the jackets at predetermined, constant temperatures. This is effected by circulating a heated fluid which enters the rolls through one of the journals 54, and guiding the fluid along a spiral path 56 along the inner surface of the jacket 52, to exit at the other journal.

The jacket of roll 50 consists of a central portion 58 comprised of an induction-hardened, ground, highly-polished and chromium-plated surface of an axial extent corresponding to the width of the surface 30 (FIG. 2), i.e., substantially to the width of the panel unit, and two end portions 60 which, in this embodiment, are in the form of sleeves 62 which fit a stepped-down portion 64 of the roll jacket 52 and are held in position by clamping rings 66. It is seen that the sleeves 60 carry the features, in negative, of the marginal portions 34 of the blank of FIG. 2, which will subsequently turn into the flange members 34' of FIG. 3.

While it is obviously possible to produce a roll 50 in which the end portions 60 of the roll jacket are integral with the central portion 58, the sleeve design has important advantages, inasmuch as the shapes of the marginal portions 34 can be altered or altogether redesigned, without the need for new calendar rolls.

FIG. 5 schematically illustrates a pair of bending rolls as used in station 18 of the production line of FIG. 1.

On a base plate 68 is mounted a support for an inclined plate 70 on which is guidedly movable a slide 72 actuated by a hydraulic cylinder (not shown). The slide 72 carries a roll 74 with a non-symmetrical V-profile, having a rounded bottom 76, a short left flank 78 and a long right flank 80. The angle α of the V-profile is slightly less than 90°, to allow for springback.

In the same center plane there is arranged, mounted on a stationary block 82, a second roll 84 which supports the strip 6' (FIGS. 1 and 2) as its flanges 34' are being formed. The active profile of the roll 84 is seen to be made up of a central, curved portion 86 of a radius equal to the radius R of the internal corner of the bend (FIG. 3), and two tangents 88 to that curved portion 86, including between them the angle α.

The bending action is produced by the long flank 80 which bears down on the strip 6' as it comes from the calender 8 via the edge trimmer 12. The short flank 78 merely holds down the end zone of the central portion 28. The smooth inside and outside radii of the bend are due to the cooperation of the two rolls 74 and 84.

Sawtooth-like projections defined by wedge-shaped recesses could also be produced on the marginal portion 34 of the lower strip surface 32 (FIG. 2). The function of these features on what, after bending, become the outer surfaces of the flanges 34', would only be to provide material which, when displaced during the roll-embossing process, will further increase the height of the teeth 36 on the inside of the flanges 34', i,.e., their retaining capability as "barbs".

For some light-duty applications in which the joints of the assembled panels are subjected to very minor forces only, the sawtooth-like projections could be produced by such machining processes as milling, rather than by roll-embossing.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A solid, optical-quality, transparent panel produced from a strip-shaped plastic extrusion, comprising:
    two fully transparent calendered major surfaces of optical quality constituting an effective panel portion, and
    two translucent flange members of lesser optical quality than said panel portion, said flange members being raised by bending action from said strip-shaped extrusion and integrally connected to said panel portion, at least one surface of each of said flange members being provided with surface features, with at least some of said surface features being dimensioned and arranged for facilitating the joining of said panel to a similar, adjacent panel and wherein at least the inside corners formed by said bending action between said effective panel portion and said flange members are rounded.

2. The panel unit as claimed in claim 1, wherein said surface features comprise at least one sawtooth-shaped ridge provided on the inside surface of said two flange members.

* * * * *